(12) United States Patent
Eckelberry

(10) Patent No.: US 6,263,801 B1
(45) Date of Patent: Jul. 24, 2001

(54) MULTI-MODE TRAILER SUSPENSION SYSTEM FOR USE WITH RAIL BOGIES

(75) Inventor: Jim Eckelberry, Canton, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/393,450

(22) Filed: Sep. 10, 1999

(51) Int. Cl.$^7$ .................................................. B61F 1/00
(52) U.S. Cl. ..................... 105/215.2; 105/157.1
(58) Field of Search .................. 105/157.1, 164, 105/215.2

(56) References Cited

U.S. PATENT DOCUMENTS

| | | |
|---|---|---|
| 4,030,777 | 6/1977 | Rabenseifner . |
| 4,955,292 * | 9/1990 | Cripe ..................................... 105/4.2 |
| 4,981,082 * | 1/1991 | Wicks ..................................... 105/4.1 |
| 5,058,917 | 10/1991 | Richardson . |
| 5,074,624 | 12/1991 | Stauble et al. . |
| 5,152,228 | 10/1992 | Donkin . |
| 5,167,190 * | 12/1992 | Galand ............................. 105/215.2 |
| 5,220,870 | 6/1993 | Larson . |
| 5,537,931 | 7/1996 | Donkin . |
| 5,826,517 | 10/1998 | Larson, Jr. et al. . |
| 5,832,836 | 11/1998 | Ehrlich et al. . |

* cited by examiner

*Primary Examiner*—S. Joseph Morano
*Assistant Examiner*—Robert J. McCarry, Jr.
(74) *Attorney, Agent, or Firm*—Carlson, Gaskey, Olds

(57) ABSTRACT

A multi-mode trailer suspension system for use on a highway and a railroad is provided. The suspension system has a frame and a sub-frame pivotally connected to the frame. At least one lower suspension arm is pivotally connected to one of either the frame or the sub-frame. The lower suspension arm supports an axle assembly. At least one suspension spring is arranged between the sub-frame and the lower suspension arm to provide damping. At least one bi-directional actuator interconnects the frame and the sub-frame for moving the sub-frame relative to the frame to a plurality of positions, namely a highway position, a rail position, and a transition position. Accordingly, the bi-directional actuator is used to raise and lower the trailer without using the suspension springs.

22 Claims, 3 Drawing Sheets

MULTI-MODE TRAILER SUSPENSION SYSTEM FOR USE WITH RAIL BOGIES

BACKGROUND OF THE INVENTION

This invention relates to an adjustable trailer suspension system for trailers intended for use with rail bogies.

Highway tractor-trailers have been adapted for use on railroads to promote efficient ground transportation of goods. These so-called bimodal or intermodal trailers can be used on the highway and then driven to a rail yard where they may be loaded onto the railroad. Various systems have been used to convert a trailer from highway use to railroad use. One such system utilizes rail bogies, which typically have two sets of rail wheels and a connection device. The rail bogies support the trailer on the railroad. Typically, for these systems, the trailer incorporates an adjustable suspension system that is movable between a highway mode, a rail mode, and a transition mode. In the highway mode, the suspension system is located in a normal operating position in which the suspension functions like a typical trailer suspension system. The transition mode is used when raising the trailer for loading the trailer on the rail bogie. Once the trailer has been loaded on the bogie, the suspension system is positioned to rail mode in which it is stowed away under the trailer to allow sufficient clearance between the trailer wheels and ground when the trailer is supported on the railroad by the bogie.

Various actuating systems have been used to move the suspension system between the different modes discussed above. For example, one prior art system uses the suspension system air springs to move between the highway and transition modes. However, larger than normal air springs are required to raise the trailer from highway mode to transition mode. Using larger air springs results in a more heavy and costly system that requires more maintenance. Further, the suspension characteristics needed for highway mode may be compromised.

SUMMARY OF THE INVENTION AND ADVANTAGES

The present invention provides a multi-mode trailer suspension system for use on a highway and a railroad. The suspension system has a frame and a sub-frame pivotally connected to the frame. At least one lower suspension arm is pivotally connected to one of either the frame or the sub-frame. The lower suspension arm supports an axle assembly. At least one suspension spring is arranged between the sub-frame and the lower suspension arm to provide damping. At least one bi-directional actuator interconnects the frame and the sub-frame for moving the sub-frame relative to the frame to a plurality of positions, namely a highway position, a rail position, and a transition position. Accordingly, the bi-directional actuator is used to raise and lower the trailer without using the suspension springs.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
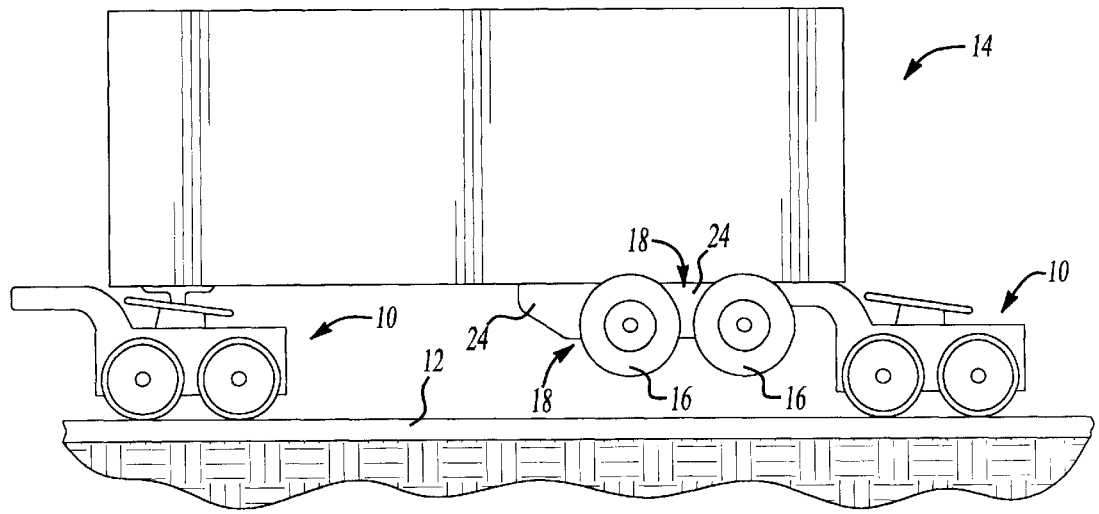
FIG. 1 is a side view of a trailer on a rail bogie.

Referring to FIG. 1, a pair of rail bogies 10 is shown on railroad tracks 12 supporting a tractor trailer 14, as is well known in the art. The rail bogies 10 and trailer 14 depicted in FIG. 1 are for illustrative purposes only and in no way limit the scope of the invention. The trailer 14 has wheels 16 that are connected to the trailer 14 by suspension systems 18. The suspension systems 18 are used to raise and lower the trailer 14 during loading and unloading onto the rail bogies 10, in addition to providing desired ride handling characteristics during highway operation of the trailer 14.

Figure 2:
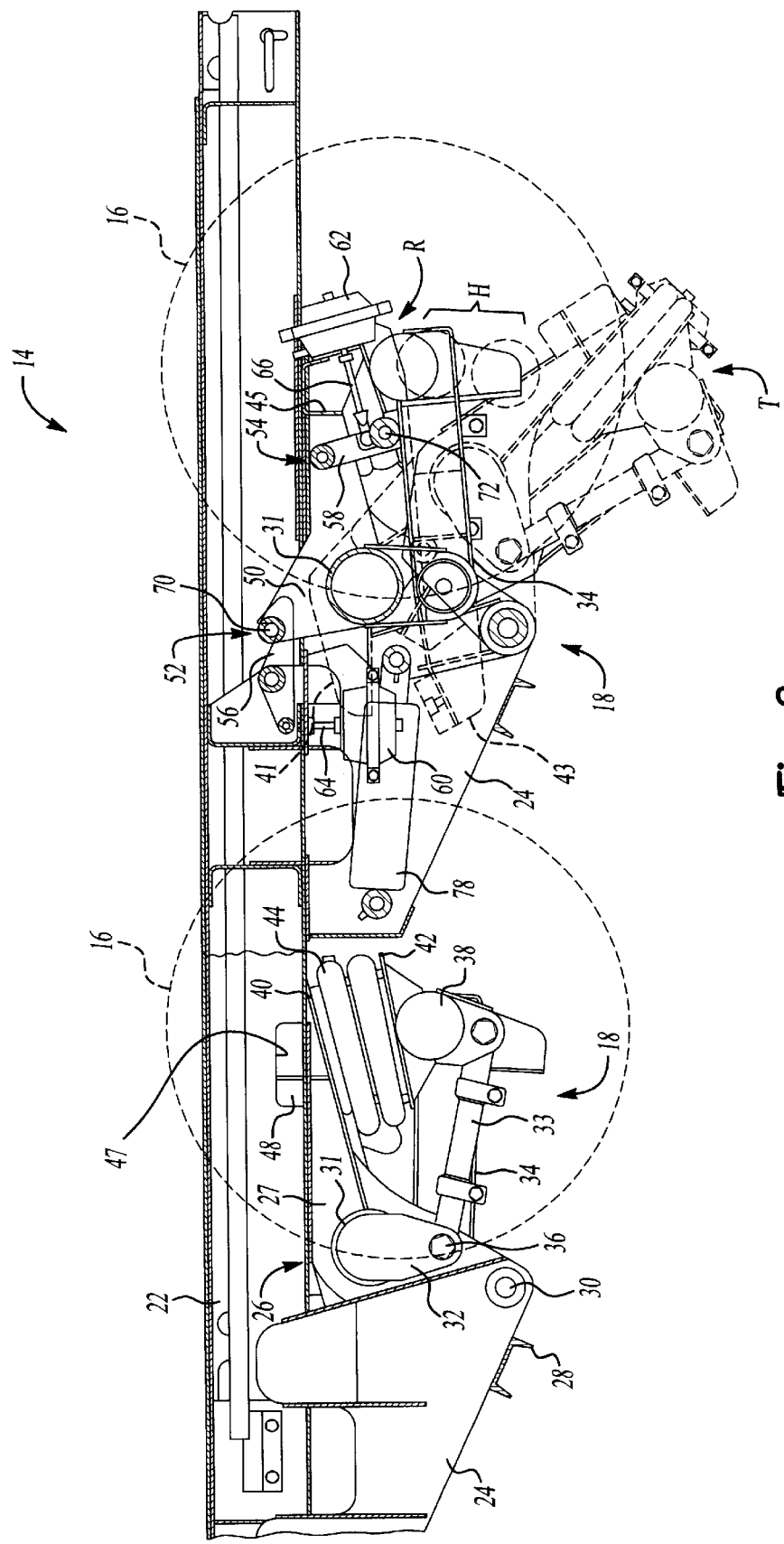
FIG. 2 is a side elevational view of the suspension system of the present invention with a partial cross-section taken along line 2—2 in FIG. 3.
Figure 3:
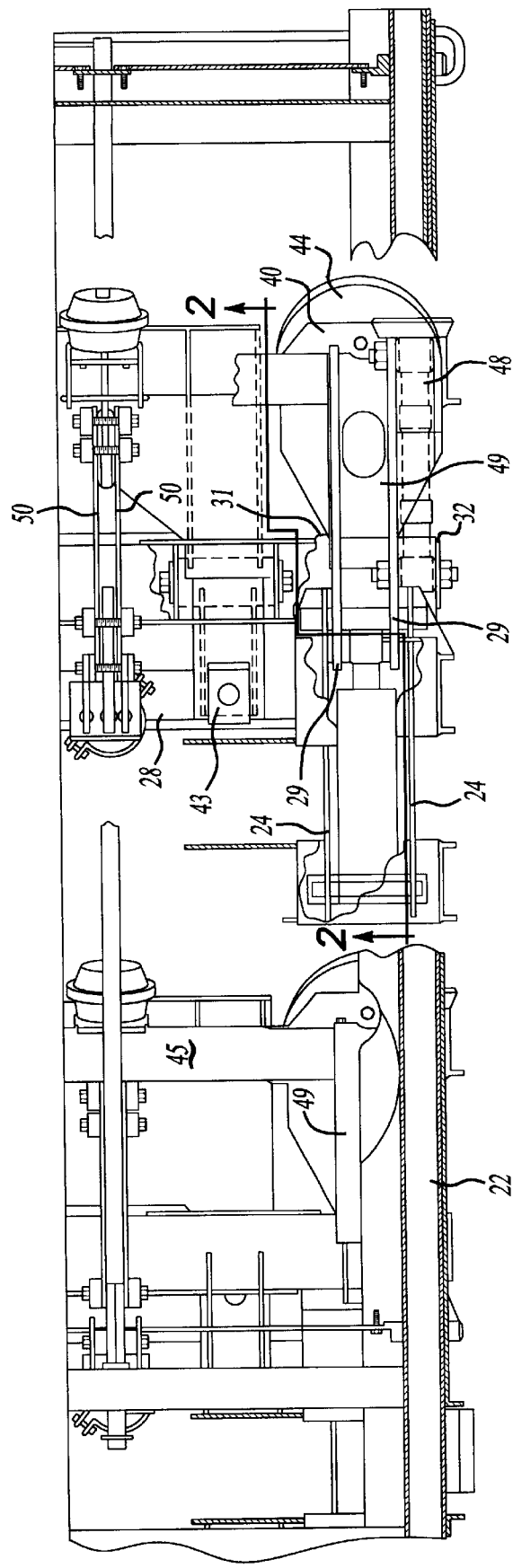
FIG. 3 is a top elevational view of the suspension system of the present invention.

Referring now to FIGS. 2 and 3, the suspension systems 18 are shown with the wheels 16 removed for clarity. A cross-section is taken from the rear-most suspension system 18, along the line shown in FIG. 3, to provide a better view of the suspension system components. FIG. 3 shows one half, or the driver's side, of the rear portion of the trailer 14. The suspension system 18 has a slider frame 22 upon which the cargo portion of the trailer 14 is attached. Opposing frame brackets 24 depend downwardly from the frame 22 and pivotally support a sub-frame 26. A reinforcement member 28 is attached to the frame brackets 24 to provide additional structural rigidity. A C-channel beam may be used as the reinforcement member 28.

The sub-frame 26 has opposing legs 27 that are pivotally connected to the frame brackets 24 by pivot pins 30 so that the sub-frame 26 may rotate about pins 30 relative to the frame 22. The sub-frame 26 carries a lower suspension arm 34 that is pivotally connected to the sub-frame 26 by pivot pins 36. It is to be understood that the lower suspension arm 34 may also be connected to the frame brackets 24 or another portion of the frame 22.

For each suspension system 18, a pair of frame brackets 24 are arranged on each side of the trailer 14, and each pair of frame brackets 24 support legs 27 of the sub-frame 26. Further, each leg 27 includes parallel members 29 that support a lower suspension arm 34. In the preferred embodiment, for each suspension system 18 there are four frame brackets 24, four legs 27, and two lower suspension arms 34. Both lower suspension arms 34 support an axle assembly 38. A horizontal tube 31 interconnects the legs 27. The tube 31 has opposing ends from which a hanger bracket 32 depends downwardly. One end of a control rod 33 is connected to the sub-frame 26 at hanger bracket 32, and the other end of the control rod 33 is connected to the axle assembly 38.

Upper 40 and lower 42 air spring plates are secured to the sub-frame 26 and axle assembly 38, respectively. Air springs 44 are interposed between the upper 40 and lower 42 plates to provide damping between the lower suspension arm 34 and the sub-frame 26 as the trailer 14 travels over an uneven highway surface. A stop 41 extends from tube 31 which coacts with a forward portion 43 of the lower suspension arm 34 to limit the rebound of the lower suspension arm 34. An upper cross-member 45 interconnects the legs 27 to provide additional rigidity to the sub-frame 26. The air spring 44 has a normal operating mode, shown in the left suspension system 18 in FIG. 2, and a non-operative mode, shown in the right suspension system 18.

Guide plates 48, which are attached to the upper portion of the sub-frame 26, coact with frame 22 to ensure that the sub-frame 26 is properly aligned with the frame 22. The legs 27 have transversely attached upper plates 49 that abut the frame 22 when the suspension system 18 is being used on the highway.

The sub-frame 26 has parallel latch plates 50 extending from the tube 31 with first 52 and second 54 latching mechanisms having at least a portion disposed between the plates 50. Each latch mechanism 52,54 respectively includes a latch 56,58 a first 60 and second 62 latch actuator for moving the latches, and a clevis 64,66 interconnecting the latches 56,58 and the first 60 and second 62 latch actuators. Preferably, brake chambers are used for the actuators. The first latch 56 is pivotally supported by the frame 22 and coacts with a latch pin 70 which is disposed between the plates 50. The first latch mechanism 52 is used to secure the sub-frame 26 to the frame 22. The second latch 58 is pivotally supported between the plates 50 and coacts with a latch pin 72 which is supported by the upper portion of the lower suspension arm 34. The second latching mechanism 54 is used to secure the lower suspension arm 34 to the sub-frame 26.

A bi-directional actuator 78 interconnects the frame 22 and the sub-frame 26 to move the sub-frame 26 relative to the frame 22 to a plurality of positions, namely a highway position, H, a rail position, R, and a transition position, T. Preferably, the actuator is a hydraulic actuator having a piston and cylinder. The hydraulic actuator may be actuated by a hydraulic pump that is electrically or pneumatically driven.

Figure 4:
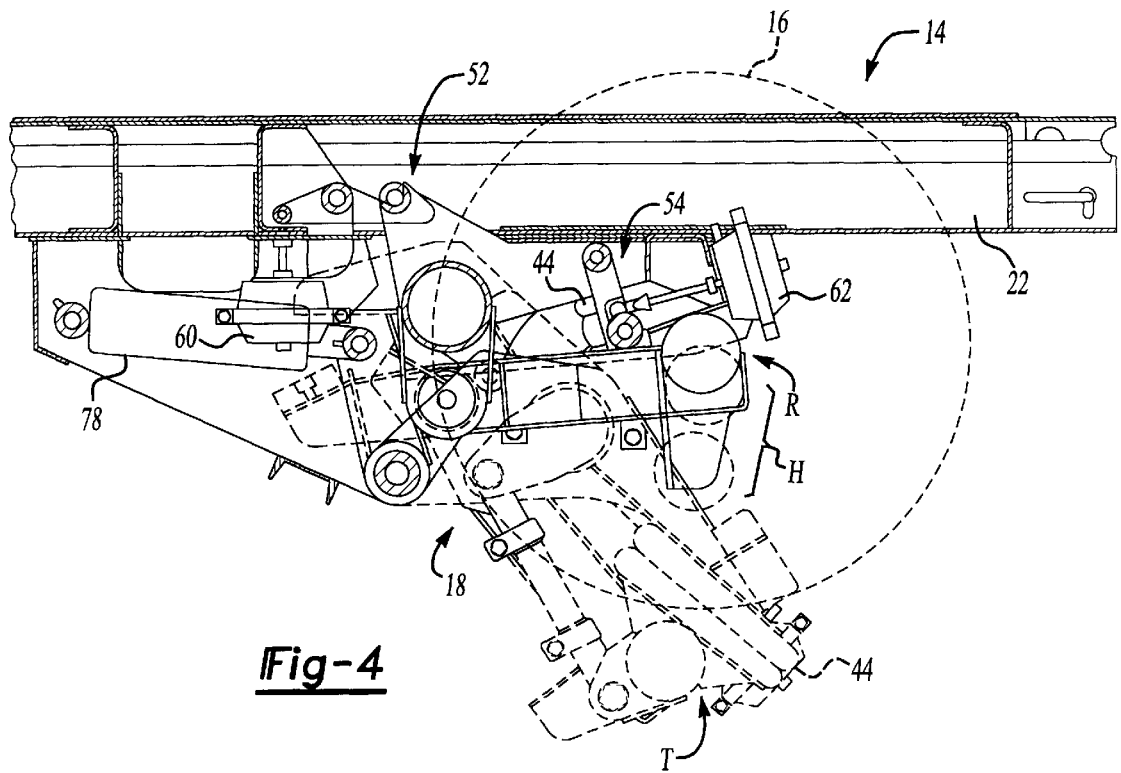
FIG. 4 is an enlarged view of the cross-sectional view shown in FIG. 2.

Referring now to FIG. 4, the bi-directional actuators 78 and latch mechanisms 52,54 cooperate to move the suspension system 18 between either the highway position, H, or the rail position, R, and the transition position, T. In the highway position, H, the sub-frame 26 abuts and is secured to the frame 22 by the first latching mechanism 52, and the air spring 44 is in the normal operating mode. In operation, the suspension system 18 is moved from the highway position, H, to the rail position, R, by deflating the air spring 44 to the non-operative position. Once the air spring 44 has been deflated, the second latching mechanism 54 may be actuated to secure the lower suspension arm 34 to the sub-frame 26. In the rail position, R, the wheels 16 are secured in a raised position to provide sufficient ground clearance between the wheels 16 and the ground while the trailer 14 is supported on the tracks 12 by the rail bogies 10.

To move from the highway position, H, to the transition position, T, the air springs 44 are deflated to a non-operative mode and the lower suspension arms 34 are secured to the sub-frame 26, similar to the rail position, R. Then the first latching mechanism 52 is actuated to unlatch the sub-frame 26 from the frame 22. With the lower suspension arm 34 still latched to the sub-frame 26, the bi-directional actuator 78 is actuated to move the sub-frame 26 away from the frame 22 and raise the trailer 14 to the transition position, T. The trailer 14 may then be loaded onto the rail bogies 10. Additionally, the transition position, T, may be used to adjust the trailer height at a loading and unloading dock.

To change from the transition mode, T, to the highway mode, H, the steps are reversed. The bi-directional actuator 78 lowers the trailer 14 until the guide plates 48 are received by the frame 22 and the sub-frame 26 abuts the frame 22. In this manner, the suspension is properly aligned relative to the frame 22. The first latching mechanism 52 is actuated to secure the sub-frame 26 and frame 22 together. The second latching mechanism 54 is actuated to release the lower suspension arm 34 from the sub-frame 26, and the air spring 44 is inflated to the normal operating mode for highway use.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A multi-mode trailer suspension system for use on a highway and a railroad comprising:
   a frame;
   a sub-frame pivotally connected to said frame;
   at least one lower suspension arm pivotally connected to one of said frame and said sub-frame, said at least one lower suspension arm supporting an axle assembly;
   at least one suspension spring interposed between said sub-frame and said at least one lower suspension arm;
   at least one bi-directional actuator interconnecting said frame and said sub-frame for moving said sub-frame relative to said frame to a plurality of positions.

2. The system as set forth in claim 1 wherein said plurality of positions include a highway position, a rail position, and a transition position, said bi-directional actuator moving said sub-frame between said positions.

3. The system as set forth in claim 2 wherein said bi-directional actuator is a hydraulic actuator having a piston and a cylinder with one of said piston and cylinder pivotally connected to said frame and the other of said piston and cylinder connected to said sub-frame.

4. The system as set forth in claim 3 wherein said hydraulic actuator is actuated by a hydroelectric pump.

5. The system as set forth in claim 3 wherein said hydraulic actuator is actuated by a hydropneumatic pump.

6. The system as set forth in claim 2 wherein said frame further includes opposing frame brackets depending downwardly from said frame, said sub-frame pivotally connected to said frame brackets.

7. The system as set forth in claim 6 wherein said frame further includes a reinforcement member attached to said opposing frame brackets.

8. The system as set forth in claim 6 wherein said sub-frame further includes at least one guide plate received in said frame when said system is in said highway and rail positions.

9. The system as set forth in claim 8 wherein said lower arm is pivotally connected to said sub-frame.

10. The system as set forth in claim 9 wherein said system includes a pair of lower suspension arms in spaced relationship, and said axle assembly supported by said pair of lower suspension arms.

11. The system as set forth in claim 8 wherein said sub-frame includes legs in spaced relationship pivotally connected to said frame, and a hanger interconnecting said legs.

12. The system as set forth in claim 11 wherein said hanger includes opposing end portions having a hanger bracket depending therefrom, said system further including a control rod interconnecting said hanger bracket and said axle assembly.

13. The system as set forth in claim 11 further including a first and second latching mechanism, said first latching mechanism securing said sub-frame to said frame in said highway and rail positions, and said second latching mechanism securing said sub-frame and said lower arm in said transition and rail positions.

14. The system as set forth in claim 13 wherein said sub-frame further includes at least one latch plate extending from said hanger and supporting a portion of each of said first and second latch mechanisms.

15. The system as set forth in claim 14 wherein said first and second latch mechanisms include a first and second latch actuator, respectively, which actuate a first and second latch, respectively.

16. The system as set forth in claim 13 wherein said suspension spring includes a normal operating mode when said system is in said highway position, and a non-operative mode when said system is in said rail and transition positions.

17. A method of loading and unloading a multi-mode trailer onto and off of a rail bogie comprising the steps of:
   (a) providing highway position in which the trailer is adapted for use on a road;
   (b) deflating at least one air spring interposed between at least one lower arm and a sub-frame supported by a frame;
   (c) moving the sub-frame away from the frame using an actuator to a transition position;
   (d) loading the trailer onto the rail bogie; and
   (e) moving the sub-frame toward the frame using the actuator to a rail position.

18. The method as set forth in claim 17 wherein step (b) is followed by the step of (b') securing the at least one lower arm to the sub-frame using a second latching mechanism, and wherein step (c) is preceded by the step of (c') unsecuring the sub-frame from the frame using a first latching mechanism, and wherein step (e) is followed by the step of (e') securing the sub-frame to the frame using the first latching mechanism.

19. The method as set forth in claim 17 further comprising the steps of:
   (f) moving the sub-frame away from the frame using the actuator from the rail position to the transition position; and
   (g) unloading the trailer off of the rail bogie.

20. The method as set forth in claim 19 wherein step (f) is preceded by the step of (f") unsecuring the sub-frame from the frame using the first latching mechanism.

21. The method as set forth in claim 19 further comprising the steps of:
   (h) moving the sub-frame toward the frame using the actuator to the highway position; and
   (i) inflating the at least one air spring.

22. The method as set forth in claim 21 wherein step (h) is followed by securing the sub-frame to the frame using the first latching mechanism, and wherein step (i) is preceded by unsecuring the at least one lower arm from the sub-frame using the second latching mechanism.

* * * * *